US012569916B2

(12) United States Patent
Song et al.

(10) Patent No.: US 12,569,916 B2
(45) Date of Patent: Mar. 10, 2026

(54) EMBEDDED DAMPING VIBRATION ATTENUATION TURNING TOOL HOLDER FOR DEEP CAVITY MACHINING AND METHOD

(71) Applicant: SHANDONG UNIVERSITY, Jinan (CN)

(72) Inventors: Qinghua Song, Jinan (CN); Xiaojuan Wang, Jinan (CN); Zhanqiang Liu, Jinan (CN); Bing Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 952 days.

(21) Appl. No.: 17/830,512

(22) Filed: Jun. 2, 2022

(65) Prior Publication Data

US 2023/0390828 A1 Dec. 7, 2023

(51) Int. Cl.
*F16F 7/104* (2006.01)
*B23B 27/00* (2006.01)
*H02N 2/18* (2006.01)

(52) U.S. Cl.
CPC ............ *B23B 27/002* (2013.01); *F16F 7/104* (2013.01); *B23B 2250/16* (2013.01); *F16F 2224/0283* (2013.01); *H02N 2/186* (2013.01)

(58) Field of Classification Search
CPC .......... B23B 2260/108; B23B 2250/16; B23B 27/14; B23B 27/002; F16F 7/104; F16F 7/108; F16F 2228/08; F16F 15/077; F16F 2224/0283; H02N 2/186

See application file for complete search history.

(56) References Cited

U.S. PATENT DOCUMENTS

2013/0300258 A1* 11/2013 Ting .......................... B23H 1/02
310/339
2021/0088104 A1* 3/2021 Wang .................... H02J 7/0068

FOREIGN PATENT DOCUMENTS

CN 209621914 U * 11/2019
CN 116104895 A * 5/2023 ............ F16F 7/1028
KR 101748071 B1 * 6/2017 ............ H01L 41/113

* cited by examiner

*Primary Examiner* — J. San Martin
(74) *Attorney, Agent, or Firm* — OLIFF PLC

(57) ABSTRACT

An embedded damping vibration attenuation turning tool holder for deep cavity machining and a method includes a tool holder and a damper; one end of the tool holder is connected with a turning blade; a side surface of the tool holder is provided with a square cavity; the damper is in interference fit in the square cavity; the damper includes a mass block, an elastic member and piezoelectric ceramic; at least one surface of the mass block that is in contact with an inner wall of the square cavity is connected with the piezoelectric ceramic; the elastic member is arranged between the piezoelectric ceramic and the mass block; and the piezoelectric ceramic is used for generating interaction with the inner wall of the square cavity under a vibration action of the tool holder, so as to absorb the vibration to generate electric energy.

8 Claims, 2 Drawing Sheets

EMBEDDED DAMPING VIBRATION ATTENUATION TURNING TOOL HOLDER FOR DEEP CAVITY MACHINING AND METHOD

TECHNICAL FIELD

The present disclosure relates to the field of turning equipment, in particular to an embedded damping vibration attenuation turning tool holder for deep cavity machining, and a method.

BACKGROUND

The description in this section merely provides background information related to the present disclosure, and does not necessarily constitute the prior art.

Large-overhang tools are widely used in machining structural parts with deep holes, deep cavities, and the like. However, due to the large overhang of such tools, the equivalent stiffness of the tool is reduced, and strong cutting vibration is easily caused, which in turn affects the cutting efficiency, reduces the surface accuracy of a part and shortens the life of the tool.

Vibration attenuation measures used for vibration attenuation for an existing tool holder include active vibration attenuation and passive vibration attenuation. For the active vibration attenuation, a feedback control system is added to a vibration attenuation system; changes of relevant state quantities in a vibration system are detected through the feedback system; and relevant structural parameters that control the vibration in the vibration attenuation system are further adjusted, so that in the case that an external environment changes, the vibration attenuation system can control a vibration structure, and a vibration response of the vibration structure is kept smallest and most stable. The vibration attenuation structure used in the active vibration attenuation is generally complex, and operations are cumbersome. High technical requirements are put forward in a production process; and the vibration attenuation structure is expensive, so that the production cost is increased, which is not conducive to its popularization in machining. Therefore, the vibration attenuation measures adopted by the current vibration attenuation tool holder are still mainly centered on the passive vibration attenuation measure.

The inventor has found that the current commonly used passive vibration attenuation is mainly divided into two forms. In one form, the main structure of a tool is changed to increase the damping of a tool structure system and achieve vibration inhibition, but this will affect the strength of a tool holder, resulting in unstable machining, a complicated internal structure and cumbersome operations. In the other form, a surface damping layer is covered on the tool holder to achieve an objective of vibration attenuation. Such a tool holder often has higher requirements for the design technology and the manufacturing cost, and it is not conducive to popularization in machining. For structural parts with deep cavity and deep hole characteristics, there is still a vibration problem in a machining process when a turning tool with a large length-diameter ratio is used. It is hard for the current turning tool holder to meet the requirement for vibration attenuation.

SUMMARY

For the shortcomings in the prior art, the present disclosure aims to provide an embedded damping vibration attenuation turning tool holder for deep cavity machining. A blocky damper is placed in a square cavity of the tool holder and is in interference fit with the square cavity to achieve damping; effective overhang of a spring rod is controlled by adjusting an axial position of a mass block on the spring rod to achieve fixing; the turning tool holder is easy to use, firm and reliable; and the problems that most vibration attenuation turning tool holders have a complicated structure, slow response and high manufacturing cost are solved.

A first objective of the present disclosure is to provide an embedded damping vibration attenuation turning tool holder for deep cavity machining, and the following technical solution is adopted:

The embedded damping vibration attenuation turning tool holder for deep cavity machining includes a tool holder and a damper; one end of the tool holder is connected with a turning blade; a side surface of the tool holder is provided with a square cavity; the damper is in interference fit in the square cavity; the damper includes a mass block, an elastic member and piezoelectric ceramic; at least one surface of the mass block that is in contact with an inner wall of the square cavity is connected with the piezoelectric ceramic; the elastic member is arranged between the piezoelectric ceramic and the mass block; and the piezoelectric ceramic is used for generating interaction with the inner wall of the square cavity under a vibration action of the tool holder, so as to absorb the vibration to generate electric energy.

Further, the damper is slidably connected with the square cavity; a spring rod is arranged between the damper and an inner wall of an axial end of the square cavity; and the damper can axially slide along the tool holder to adjust a relative position of the square cavity.

Further, an open end of the square cavity is matched with a stop cover; the stop cover is used for blocking an opening of the square cavity to close the damper in the square cavity; one surface of the mass block facing to the stop cover is connected with the piezoelectric ceramic through the elastic member; and the piezoelectric ceramic is in contact with and fitted to the stop cover.

Further, the mass block is of a cubic structure; four surfaces are respectively connected with the corresponding piezoelectric ceramic through the elastic members; and every two of the four surfaces are oppositely disposed to jointly generate the damping action.

Further, the elastic member includes a base plate and an elastic pad; and one side of the elastic pad is connected with the piezoelectric ceramic, and the other side is connected with the mass block through the base plate.

Further, the piezoelectric ceramic is connected with a lead wire; and the lead wire acquires the electric energy generated by the piezoelectric ceramic and is led out of the square cavity and connected to collection equipment to acquire a working state of the piezoelectric ceramic.

Further, an end part of the tool holder is provided with a tool bit; the tool bit is mounted at the end part of the tool holder through a connector to form a cantilever beam structure; and the turning blade is fixed on the tool bit.

Further, one end of the tool holder close to the connector is provided with a blind hole.

A second objective of the present disclosure is to provide a deep cavity machining method using the above-mentioned embedded damping vibration attenuation turning tool holder for deep cavity machining. The method includes:

arranging the piezoelectric ceramic on the two groups of opposite surfaces of the mass block to form the damper; placing the entire damper into the square cavity of the tool holder to form interference fit; and buckling the stop cover on the square cavity until the stop cover is in contact with the piezoelectric ceramic;

mounting the tool holder on a lathe; mounting the turning blade on the tool bit at the tail end; threading one end of the lead wire through the stop cover and connecting the end to the piezoelectric ceramic; connecting the other end to external collection equipment; and machining a deep cavity through the turning blade; and converting the vibration of the tool holder into vibration of the mass block in the damper and electric energy output by the piezoelectric ceramic to absorb the vibration of the tool holder.

Further, the electric energy generated by the piezoelectric ceramic is output; and parameters of the damper are adjusted through feedback control until the parameters meet a vibration attenuation requirement of the tool holder.

Compared with the prior art, the present disclosure has the advantages and active effects that:

(1) A blocky damper is placed in a square cavity of the tool holder and is in interference fit with the square cavity to achieve damping; effective overhang of a spring rod is controlled by adjusting an axial position of a mass block on the spring rod to achieve fixing; the turning tool holder is easy to use, firm and reliable; and the problems that most vibration attenuation turning tool holders have a complicated structure, slow response and high manufacturing cost are solved.

(2) Passive vibration attenuation is achieved by an additional vibration absorber. The blocky damper is a vibration sub-system added to a main system, and relies on the additional mass block to absorb the vibration, thus achieving the vibration attenuation. A classical single-degree-of-freedom vibration absorber has a simple structure, is widely applied to tool vibration attenuation, is then generally applied to deep cavity and deep hole machining within a certain range, and can achieve batch application.

(3) The damper transmits the vibration energy of the tool to the mass block and a damping element of the damper, and the piezoelectric ceramic serving as the damping element can convert the vibration of the main structure into the vibration of the mass block of the vibration absorber and the electric energy output by the piezoelectric ceramic, so that the vibration attenuation effect is enhanced; the structure is simple; and the performance is more stable.

(4) The effective overhang of the spring rod in the square cavity is adjusted by adjusting the axial position of the mass block on the spring rod, so that frequency tuning of the damper within a wide range is achieved, and the damper exerts a better vibration attenuation effect on the tool.

(5) The piezoelectric ceramic material can absorb energy from the vibration and convert the energy into electric energy. This process reacts on the structure in the form of damping. The embedded damping vibration attenuation turning tool holder has the advantages of high rigidity, fast response, stable performance and the like, can be applied to machining of long-overhang turning tools in the industries including aviation and aerospace, is particularly used for improving the machining performance of machining of some airplane structural parts with deep cavity and deep hole characteristics in the requirement aspects including lightweight machining, noise, stability and reliability, and has a wide popularization and application prospect.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation on the present disclosure.

Figure 1:
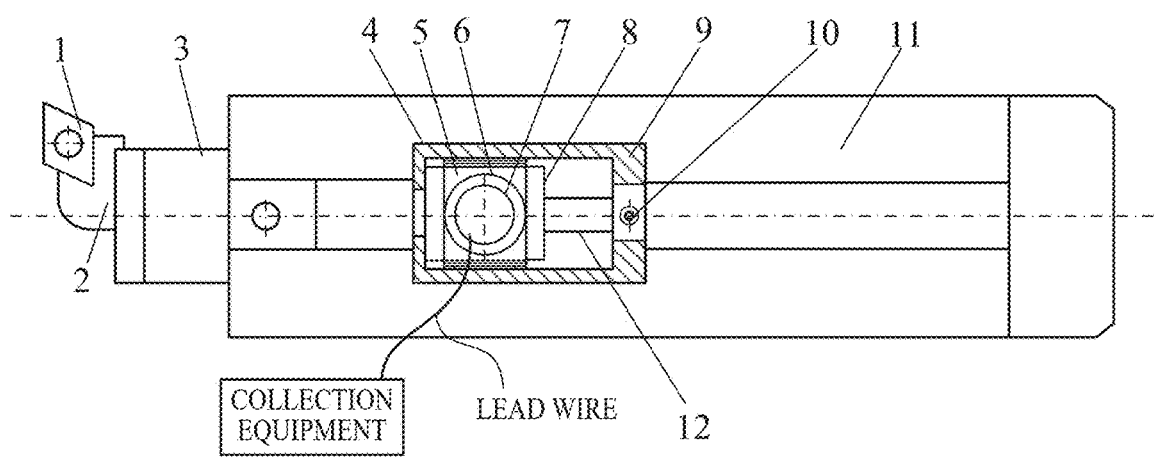
FIG. 1 is a schematic diagram of an entire structure of a turning tool holder in Embodiments 1 and 2 of the present disclosure.

In the drawings, 1: turning blade; 2: tool bit; 3: connector; 4: square cavity; 5: rubber pad; 6: copper base plate; 7: piezoelectric ceramic; 8: mass block; 9: stop cover; 10: threaded hole; 11: tool holder; 12: spring rod; and 13: through hole.

DETAILED DESCRIPTION

It should be noted that the following detailed descriptions are all exemplary and are intended to provide a further description of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

For convenience of description, the terms "upper", "lower", "left", and "right" only indicate upper, lower, left, and right directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present disclosure.

As described in the background, a schematic structural diagram of a stop cover of a damper in the prior art is illustrated. For the above problems, the present disclosure provides an embedded damping vibration attenuation turning tool holder for deep cavity machining and a method.

Embodiment 1

In one classical implementation of the present disclosure, as shown in the figures, an embedded damping vibration attenuation turning tool holder for deep cavity machining is provided.

The turning tool holder mainly includes a tool holder 11, a damper and a working head; a tool holder body is provided with a groove; the damper is arranged in the groove; the working head is connected to one end of the tool holder; the working head generates vibration during working; and the damper serves as a following structure in the groove to absorb the vibration of the tool holder, thus achieving a vibration attenuation effect.

Specifically, a hexagonal prism-shaped tool holder is taken as an example. A side surface of the tool holder is provided with a groove, and a square cavity 4 formed by the groove is used for accommodating the damper; the damper is in interference fit with the square cavity; and damping is formed between an inner wall of the square cavity and the damper. When the tool holder vibrates, the damper serving as a vibration sub-system can absorb vibration of a mass block and generate power from the vibration through piezoelectric ceramic arranged in the damper, thus achieving the objective of consuming the vibration for vibration attenuation.

The generality is high, and passive vibration attenuation is achieved by an additional vibration absorber. The blocky damper is a vibration sub-system added to a main system, and relies on the additional mass block to absorb the vibration, thus achieving the vibration attenuation. A classical single-degree-of-freedom vibration absorber has a simple structure, is widely applied to tool vibration attenuation, is then generally applied to deep cavity and deep hole machining within a certain range, and can achieve batch application.

A blocky damper is embedded in a square cavity of the tool body and is in interference fit with the square cavity to achieve damping; a spring rod is arranged between the damper and the square cavity of the tool body; one end of the spring rod is abutted against a side wall of the damper, and the other end is abutted against an inner wall of the square cavity; and effective overhang of the spring rod is controlled by adjusting an axial position of the mass block on the spring rod, so that the damper can be properly adjusted in position according to vibration of a tool, and the vibration attenuation effect of the damper is fully exerted.

One end of the tool holder is connected with a tool bit 2 through a connector 3. A diamond-shaped turning blade 1 is mounted on the tool bit; and a connection position of the connector and the tool holder is of a stepped structure, so that the weight of a tail dangling end of the tool holder is reduced.

Further, in this embodiment, an upper middle part of the tool holder is milled into a plane provided with a blind hole to reduce the weight of the turning tool holder.

It can be understood that the overall objective of disposing the dangling end of the tool holder is to reduce, on the basis of meeting a strength requirement of the tool holder, the weight of the tail dangling end, thus reducing the influence of the vibration of the tail end on the clamping stability of the tool holder in the working process.

Figure 2:
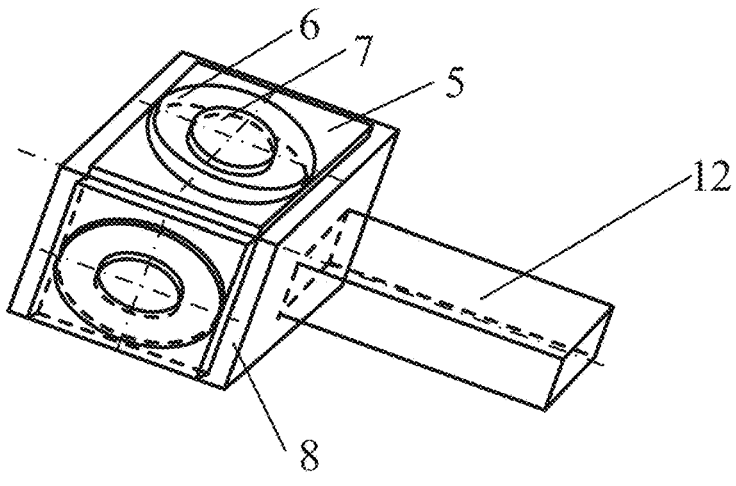
FIG. 2 is a schematic structural diagram of a damper in Embodiments 1 and 2 of the present disclosure.

For the structure of the damper, as shown in FIG. 2, the damper is embedded into the square cavity of the tool holder, and a damping effect is achieved by interference fit. The damper includes piezoelectric ceramic 7, copper base plates 6, rubber pads 5, a mass block 8 and a spring rod 12. The entire mass block is of a cubic structure; and two groups of opposite surfaces are provided with the copper base plates. Each copper base plate is connected with the piezoelectric ceramic through the rubber pad and is in contact with an inner wall of the square cavity.

The spring rod is connected to a side surface of the mass block that is not provided with the copper base plates. The other end of the spring rod is abutted against the inner wall of the square cavity to restrict the position of the mass block in the square cavity.

The effective overhang of the spring rod in the square cavity is adjusted by adjusting the axial position of the mass block on the spring rod, so that frequency tuning of the damper within a wide range is achieved, and the damper exerts a better vibration attenuation effect on the tool.

An open position of the square cavity is matched with a stop cover 9. The stop cover is buckled at the open position of the square cavity to block the square cavity and can be in contact with a group of piezoelectric ceramic at the top of the damper, so as to cooperate with three groups of piezoelectric ceramic in contact with the square cavity to jointly limit the position of the damper in the square cavity.

In terms of adjustment of the damper, a damping magnitude can be adjusted by changing a frictional coefficient of the piezoelectric ceramic in contact with the outside, the elasticity of the rubber pads and the number of pieces of piezoelectric ceramic.

If the number of pieces of piezoelectric ceramic and the specification of the rubber pads are the same, a larger frictional coefficient of a surface of the piezoelectric ceramic that is in contact with the inner wall of the square cavity or the stop cover causes a higher frictional force to the piezoelectric ceramic, so that the damping effect between the damper and the square cavity is better. Therefore, the surface frictional coefficient of the surface of the piezoelectric ceramic that is in contact with the outside can be appropriately adjusted according to a requirement, which may be specifically achieved by replacing with different types of piezoelectric ceramic.

If other conditions are the same, the frictional force between the piezoelectric ceramic and the outside can be changed by changing a pressure generated by the piezoelectric ceramic which is in contact with the outside. The frictional force on the piezoelectric ceramic can be increased by increasing the pressure generated by the piezoelectric ceramic which is in contact with the outside, so that the damping effect between the damper and the square cavity is better. Therefore, the pressure generated by the piezoelectric ceramic which is in contact with the outside can be appropriately adjusted according to a requirement, which may be specifically achieved by changing a pre-tightening force between the damper and the square cavity, such as changing the thickness of the piezoelectric ceramic and changing the elasticity of the rubber pads.

If other external conditions are the same, the frictional force can be adjusted by changing an area of contact between the damper and the outside. In this embodiment, the four surfaces of the mass block are all provided with the piezoelectric ceramic. The area of contact between the entire damper and the outside can be changed by changing the number of the piezoelectric ceramic arranged on the mass block, thus achieving an effect of adjusting the damping magnitude of the damper. Of course, the size of the damper can also be changed according to a requirement. Thus, the damping magnitude is adjusted by means of adjusting the area of contact between the damper and the outside.

The blocky damper transmits vibration energy of the large-overhang tool to the mass block and a damping element of the damper. The piezoelectric ceramic serving as the damping element converts the vibration of the main structure into vibration of the mass block of the vibration absorber and electric energy generated by the piezoelectric ceramic, so that the vibration attenuation effect is enhanced.

The piezoelectric ceramic material can absorb energy from the vibration and convert the energy into electric energy. This process reacts on the structure in the form of damping. The embedded damping vibration attenuation turning tool holder has the advantages of high rigidity, fast response, stable performance and the like.

Figure 3:
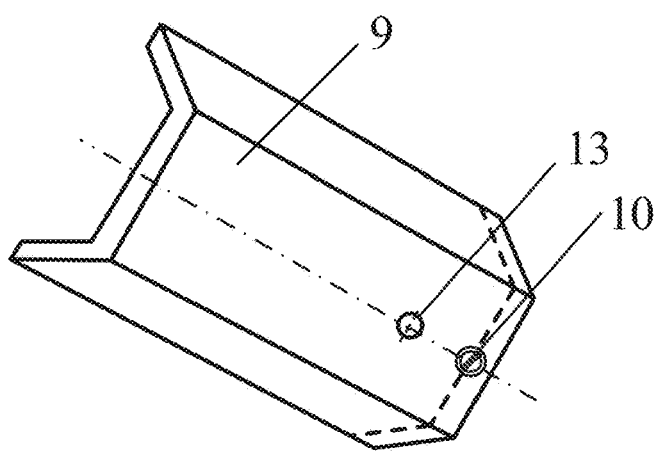
FIG. 3 is a schematic structural diagram of a stop cover of a damper in Embodiments 1 and 2 of the present disclosure.
Figure 4:
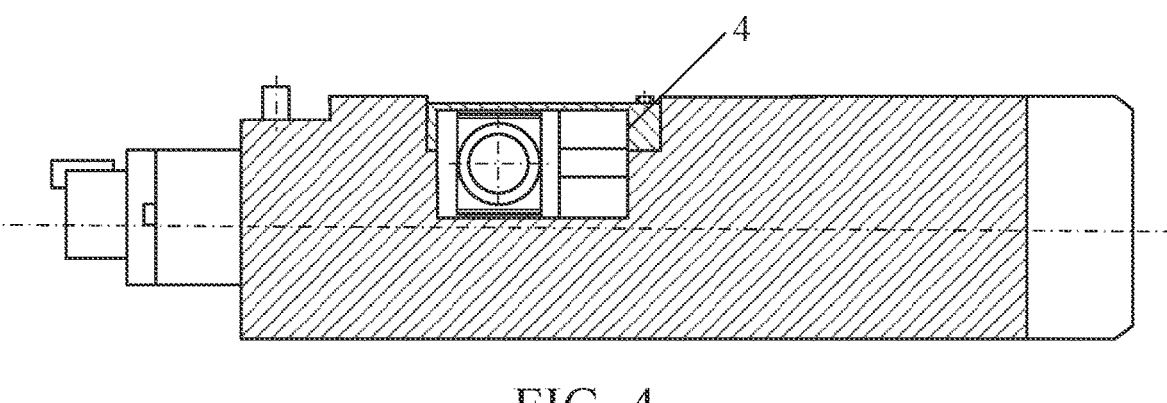
FIG. 4 is a schematic diagram of cooperation between a damper and a square cavity of a tool holder in Embodiments 1 and 2 of the present disclosure.

The structure of the stop cover of the damper is as shown in FIG. 3, and the stop cover is matched with the square cavity structure preset on the tool holder and is buckled on the square cavity to close the damper in the square cavity. The stop cover can be in contact with the piezoelectric ceramic at the top end of the damper to form a part of the damping effect.

The stop cover is provided with a through hole 13 and a threaded hole 10. The threaded hole is used for cooperating with a threaded connector to fix the stop cover on the tool holder, thus avoiding the damper from being exposed to the outside and achieving protection for the damper.

The through hole is used for allowing a lead wire to pass through. A wire is connected to the piezoelectric ceramic in the square cavity through the through hole; and the vibration absorbed by the piezoelectric ceramic material from the main structure is converted and formed into electric energy for outputting, so that a vibration state of the piezoelectric ceramic material is fed back in real time according to an output electric energy signal, thus acquiring a machining state of the large-overhang tool.

The piezoelectric ceramic type damper is applied to a turning tool with a large length-diameter ratio. The damper transmits the vibration energy of the tool to the mass block and the damping element of the damper, and the piezoelectric ceramic serving as the damping element can convert the vibration of the main structure into the vibration of the mass block of the vibration absorber and the electric energy output by the piezoelectric ceramic, so that the vibration attenuation effect is enhanced; the structure is simple; and the performance is more stable.

On the basis of acquiring the vibration state of the large-overhang tool during the machining, the parameters of the damper can be adjusted to improve the damping effect of the damper on the tool holder, thus making the machining process more stable.

The embedded damping vibration attenuation turning tool holder only has a tool body, a blocky damper and a stop cover, so that the structure is simple; the entire structure is stable and reliable; and the production difficulty is low. The embedded damping vibration attenuation turning tool holder is convenient to use and good in vibration attenuation effect. The blocky damper is put into the square cavity of the tool holder to be in interference fit with the square cavity to achieve damping.

The effective overhang of the spring rod is controlled by adjusting the axial position of the mass block on the spring rod to achieve fixing, so that the embedded damping vibration attenuation turning tool holder is easy to use, firm and reliable; the problems that most vibration attenuation turning tool holders have a complicated structure, slow response and high manufacturing cost are solved; furthermore, the piezoelectric ceramic material with high rigidity, fast response and stable performance is used as a damping carrier to convert the vibration of the main structure into the vibration of the mass block of the vibration absorber and the electric energy output by the piezoelectric ceramic, which enhances the vibration attenuation effect.

Embodiment 2

In another classical implementation of the present disclosure, as shown in the figures, a deep cavity machining method is provided, which uses the embedded damping vibration attenuation turning tool holder for deep cavity machining in Embodiment 1.

The method includes:

arranging the piezoelectric ceramic on the two groups of opposite surfaces of the mass block to form the damper; placing the entire damper into the square cavity of the tool holder to form interference fit; and buckling the stop cover on the square cavity until the stop cover is in contact with the piezoelectric ceramic;

mounting the tool holder on a lathe; mounting the turning blade on the tool bit at the tail end; threading one end of the lead wire through the stop cover and connecting the end to the piezoelectric ceramic; connecting the other end to external collection equipment; and machining a deep cavity through the turning blade;

converting the vibration of the tool holder into vibration of the mass block in the damper and electric energy output by the piezoelectric ceramic to absorb the vibration of the tool holder; and outputting the electric energy generated by the piezoelectric ceramic, and adjusting parameters of the damper through feedback control until the parameters meet a vibration attenuation requirement of the tool holder.

Specifically, the foregoing processes are described in detail with reference to Embodiment 1, including the following steps:

step 1: sequentially attaching the piezoelectric ceramic, the copper base plates and the rubber pads on the four symmetric surfaces, namely upper, lower, front and rear surfaces, of the mass block; connecting the spring rod to one of left and right ends of the mass block; and controlling effective overhang of the spring rod by adjusting an axial position of the mass block on the spring rod;

step 2: embedding the blocky damper formed in the step 1 into the square cavity of the tool holder to enable the damper to be in interference fit with the square cavity to achieve damping; adjusting the damping magnitude by adjusting a damping material, the number and the pre-tightening force; and converting the vibration of the main structure into the vibration of the mass block of the vibration absorber and the electric energy output by the piezoelectric ceramic;

step 3: connecting the wire to the piezoelectric ceramic through the through hole; outputting the electric energy which is converted and formed from the vibration absorbed by the piezoelectric ceramic material from the main structure; and adjusting parameters such as the size of the damper through feedback control to enhance the vibration attenuation effect; and step 4: matching the stop cover of the damper with the square cavity in the tool holder, thus achieving an effect of protecting the damper by means of threaded connection.

The foregoing descriptions are merely exemplary embodiments of the present disclosure, but are not intended to limit the present disclosure. A person skilled in the art may make various modifications, combinations, and variations to the present disclosure. Any modification, equivalent replacement, or improvement made within the spirit and principle of the present disclosure shall fall within the protection scope of the present disclosure.

What is claimed is:

1. An embedded damping vibration attenuation turning tool holder for deep cavity machining, comprising a tool holder and a damper, wherein:

one end of the tool holder is connecting to a turning blade;

a side surface of the tool holder is provided with a square cavity;

the damper is in interference fit in the square cavity;

the damper comprises a mass block, an elastic member and a piezoelectric ceramic at least one surface of surfaces of the mass block being in contact with an inner wall of the square cavity is connecting to the piezoelectric ceramic; the elastic member is arranged between the piezoelectric ceramic and the mass block; and the piezoelectric ceramic absorbs and converts vibration generated by the tool holder into electric energy;

the damper is slidably connecting to the square cavity; a spring rod is arranged between the damper and an inner wall of an axial end of the square cavity; and the damper is capable of axially sliding along the tool holder to adjust a relative position of the square cavity.

2. The embedded damping vibration attenuation turning tool holder for deep cavity machining according to claim 1, wherein an open end of the square cavity is matched with a stop cover; the stop cover is used for blocking an opening of the square cavity to close the damper in the square cavity; one surface of the mass block facing to the stop cover is connecting to the piezoelectric ceramic through the elastic member; and the piezoelectric ceramic is in contact with and fitted to the stop cover.

3. The embedded damping vibration attenuation turning tool holder for deep cavity machining according to claim 1, wherein the mass block is of a cubic structure; four surfaces are respectively connecting to the corresponding piezoelectric ceramic through the elastic members; and every two of the four surfaces are oppositely disposed to jointly generate the damping action.

4. The embedded damping vibration attenuation turning tool holder for deep cavity machining according to claim 1, wherein the elastic member comprises a base plate and an elastic pad; and one side of the elastic pad is connecting to the piezoelectric ceramic, and the other side is connecting to the mass block through the base plate.

5. The embedded damping vibration attenuation turning tool holder for deep cavity machining according to claim 1, wherein the piezoelectric ceramic is connecting to a lead wire; and the lead wire acquires the electric energy generated by the piezoelectric ceramic and is led out of the square cavity and connected to collection equipment to acquire a working state of the piezoelectric ceramic.

6. The embedded damping vibration attenuation turning tool holder for deep cavity machining according to claim 1, wherein an end part of the tool holder is provided with a tool bit; the tool bit is mounted at the end part of the tool holder through a connector to form a cantilever beam structure; and the turning blade is fixed on the tool bit.

7. A deep cavity machining method for using the embedded damping vibration attenuation turning tool holder for deep cavity machining according to claim 1, wherein the embedded damping vibration attenuation turning tool holder is further configured so that:

the mass block is of a cubic structure; four surfaces of the mass block being in contact with the inner wall of the square cavity are respectively connecting to a corresponding piezoelectric ceramic through the elastic members; and every two of the four surfaces are oppositely disposed to jointly generate the damping action;

an open end of the square cavity is matched with a stop cover; the stop cover is used for blocking an opening of the square cavity to close the damper in the square cavity; one surface of the mass block facing to the stop cover is connecting to the piezoelectric ceramic through the elastic member; and the piezoelectric ceramic is in contact with and fitted to the stop cover;

the piezoelectric ceramic is connecting to a lead wire; and the lead wire acquires the electric energy generated by the piezoelectric ceramic and is led out of the square cavity and connected to collection equipment to acquire a working state of the piezoelectric ceramic;

the deep cavity machining method comprises:

arranging the piezoelectric ceramic on two groups of opposite surfaces of the mass block to form the damper; placing the entire damper into the square cavity of the tool holder to form interference fit; and buckling the stop cover on the square cavity until the stop cover is in contact with the piezoelectric ceramic;

mounting the tool holder on a lathe; mounting the turning blade on the tool bit at the tail end; threading one end of the lead wire through the stop cover and connecting the end to the piezoelectric ceramic; connecting the other end to external collection equipment; and machining a deep cavity through the turning blade; and converting the vibration of the tool holder into vibration of the mass block in the damper and electric energy output by the piezoelectric ceramic to absorb the vibration of the tool holder.

8. The deep cavity machining method according to claim 7, wherein the electric energy generated by the piezoelectric ceramic is output; and parameters of the damper are adjusted through feedback control until the parameters meet a vibration attenuation requirement of the tool holder.

* * * * *